United States Patent
Tabata (10) Patent No.: US 8,961,122 B2
(45) Date of Patent: Feb. 24, 2015

(54) TURBINE HOUSING FOR TURBOCHARGER (75) Inventor: Masakazu Tabata, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/004,487

(22) PCT Filed: Apr. 26, 2011

(86) PCT No.: PCT/JP2011/060159
§ 371 (c)(1),
(2), (4) Date: Sep. 11, 2013

(87) PCT Pub. No.: WO2012/147161
PCT Pub. Date: Nov. 1, 2012

(65) Prior Publication Data
US 2014/0037436 A1 Feb. 6, 2014

(51) Int. Cl.
F04D 29/44 (2006.01)
F01D 25/24 (2006.01)
F02C 6/12 (2006.01)

(52) U.S. Cl.
CPC . F01D 25/24 (2013.01); F02C 6/12 (2013.01); F05D 2220/40 (2013.01)
USPC .......................................... 415/204

(58) Field of Classification Search
USPC .............. 415/184, 169.2, 204, 212.1
See application file for complete search history.

(56) References Cited

U.S. PATENT DOCUMENTS 6,062,028 A 5/2000 Arnold et al.
2009/0301082 A1* 12/2009 Lombard et al. ............... 60/602

FOREIGN PATENT DOCUMENTS

| JP | 60-024839 U | 2/1985 |
|---|---|---|
| JP | 2002-004871 A | 1/2002 |
| JP | 2002-349275 A | 4/2002 |
| JP | 2002-519581 A | 7/2002 |
| JP | 2005-163692 A | 6/2005 |
| JP | 2006-161579 A | 6/2006 |
| JP | 2007-120396 A | 5/2007 |
| JP | 2007-278221 A | 10/2007 |
| JP | 2007-309139 A | 11/2007 |
| JP | 2008-121470 A | 5/2008 |
| JP | 2008-208787 A | 9/2008 |
| JP | 2009-041551 A | 2/2009 |
| JP | 2009-047027 A | 3/2009 |
| JP | 2010-112195 A | 5/2010 |

* cited by examiner

Primary Examiner — Edward Look
Assistant Examiner — Aaron R Eastman
(74) Attorney, Agent, or Firm — Sughrue Mion, PLLC (57) ABSTRACT A turbine housing (3) applied to a turbine (2) incorporated in a turbocharger (1) includes a main body (10) in which a wheel housing chamber (13) housing a turbine wheel (4) and an exhaust passage (15) are provided. The exhaust passage (15) has one end communicating with an outlet of the wheel housing chamber (13) and the other end providing an exhaust port (15a). The main body (10) is provided with an upstream-side inner pipe (20) and a downstream-side inner pipe (21) therein. The upstream-side inner pipe has a shroud portion (20) which is located in the wheel housing chamber (13) and extends along edges of turbine blades (5) of the turbine wheel (4). The downstream-side inner pipe (21) is arranged in the exhaust passage (15) so as to be located on a downstream side of the upstream-side inner pipe (20). A thickness (t2) of the downstream-side inner pipe (21) is thinner than a thickness (t1) of the upstream-side inner pipe (20).

6 Claims, 8 Drawing Sheets

TURBINE HOUSING FOR TURBOCHARGER

CROSS REFERENCE TO RELATED APPLICATIONS

This application is a National Stage of International Application No. PCT/JP2011/060159, filed on Apr. 26, 2011, the contents of all of which are incorporated herein by reference in their entirety.

TECHNICAL FIELD

The present invention relates to a turbine housing of a turbine which is incorporated in a turbocharger.

BACKGROUND ART

In a turbine being incorporated in a turbocharger, there is known a turbine which has an exhaust nozzle located in a turbine housing separately from the housing, and a gap between the housing and the exhaust nozzle is sealed by a sealing body (see Patent Literature 1). In addition, there are Patent Literatures 2-5 as prior art references in relation to the present invention.

CITATION LIST

Patent Literature

Patent Literature 1: JP-2010-112195A
Patent Literature 2: JP-2007-278221A
Patent Literature 3: JP-2002-004871A
Patent Literature 4: JP-2002-519581A
Patent Literature 5: JP-2009-041551A

SUMMARY OF INVENTION

Technical Problem

As well known, exhaust gas of an internal combustion engine includes water. And, there is known a problem that when a temperature of the exhaust gas is decreased in the turbine of the turbocharger, the water condenses and attaches to the inside of the turbine, and thereby parts of the turbine is corroded. In the turbine of the Patent Literature 1, it is suppressed a entering of the condensed water to the gap by the sealing body. However, it is not considered a removal of the condensed water from the inside of the turbine.

In view of the foregoing, one object of the present invention is to provide a turbine housing capable of removing condensed water quickly.

Solution to Problem

A turbine housing of the present invention is applied to a turbine incorporated in a turbocharger, the turbine housing including a main body, in which a wheel housing chamber housing a turbine wheel and an exhaust passage are provided, the exhaust passage having one end communicating with an outlet of the wheel housing chamber and the other end providing an exhaust port, and gas passing through the wheel housing chamber being discharged from the exhaust port to outside through the exhaust passage, wherein the main body is provided with an upstream-side inner pipe and a downstream-side inner pipe therein, the upstream-side inner pipe having a shroud portion which is located in the wheel housing chamber and extends along edges of turbine blades of the turbine wheel, the downstream-side inner pipe being arranged in the exhaust passage so as to be located on a downstream side with respect to a direction of gas flow to the upstream-side inner pipe, and a thickness of the downstream-side inner pipe is thinner than a thickness of the upstream-side inner pipe.

As well known, since a temperature of exhaust gas decreases in a downstream side of the turbine wheel, condensed water is easy to generate. Furthermore, since a swirl flow is generated, the condensed water is easy to attach to an inner surface of the turbine housing by centrifugal force. According to the turbine housing of the present invention, since the thickness of the downstream-side inner pipe being provided on such position is thin, it is possible to decrease a heat capacity of the downstream-side inner pipe. In this case, since it is possible to increase a temperature of the downstream-side inner pipe quickly, even if the condensed water attaches, it is possible to evaporate attached condensed water quickly. Thereby, it is possible to remove the condensed water quickly. Furthermore, it is possible to suppress corrosion of the downstream-side inner pipe.

Furthermore, in the turbine housing of the present invention, since the thickness of the upstream-side inner pipe is thick, it is possible to increase stiffness of the upstream-side inner pipe. Thereby, since it is possible to suppress deformation of the upstream-side inner pipe, it is possible to maintain a clearance between the shroud portion and the turbine blades. Accordingly, it is possible to prevent decrease of a efficiency of the turbine.

In one embodiment of the turbine housing of the present invention, wherein a flange for connecting an exhaust pipe to downstream of the exhaust passage may be provided around the exhaust port of the main body, and a length of the downstream-side inner pipe may be set so that an end portion located on the downstream side of the gas flow of the downstream-side inner pipe protrudes from the main body. As well known, the condensed water is easy to collect on a connecting portion of the flange and the exhaust pipe. In this embodiment, since the downstream-side inner pipe extends to the connecting portion, it is possible to evaporate the condensed water which is collected on the connecting portion quickly by the heat of the downstream-side inner pipe. Thereby, it is possible to suppress collecting of the condensed water to the connecting portion.

In one embodiment of the turbine housing of the present invention, wherein the downstream-side inner pipe maybe fixed to the main body by plural fixing members which are provided between the downstream-side inner pipe and the main body, and the plural fixing members may be arranged on an outer circumferential of the downstream-side inner pipe so as to be separated from each other in a circumferential direction. In this case, even when the condensed water enters a clearance between the downstream-side inner pipe and the main body, it is possible to discharge the condensed water quickly. Thereby, it is possible to prevent collecting of the condensed water in the clearance.

In one embodiment of the turbine housing of the present invention, wherein the downstream-side inner pipe may be made by a material which has a corrosion resistance higher than the upstream-side inner pipe. In this case, it is possible to suppress the corrosion of the downstream-side inner pipe by the condensed water further.

In one embodiment of the turbine housing of the present invention, wherein on an outer surface of the downstream-side inner pipe, a surface treatment may be performed so that a heat radiation performance of the outer surface is higher than that of an inner surface of the downstream-side inner pipe. In this case, it is possible to increase a temperature of the part of the exhaust passage in the main body by radiation heat from the downstream-side inner pipe. Thereby, it is possible to prevent generating the condensed water.

In one embodiment of the turbine housing of the present invention, wherein an end portion located on the downstream side of the gas flow of the upstream-side inner pipe and an end portion located on the upstream side of the gas flow of the downstream-side inner pipe may be formed cylindrically, and an inside diameter of the end portion located on the upstream side of the gas flow of the downstream-side inner pipe may be larger than an outside diameter of the end portion located on the downstream side of the gas flow of the upstream-side inner pipe. In this case, even if the downstream-side inner pipe moves to a side of the upstream-side inner pipe, no force is applied to the upstream-side inner pipe. Thereby, it is possible to maintain the clearance between the shroud portion and the turbine blades.

DESCRIPTION OF EMBODIMENTS

Figure 1:
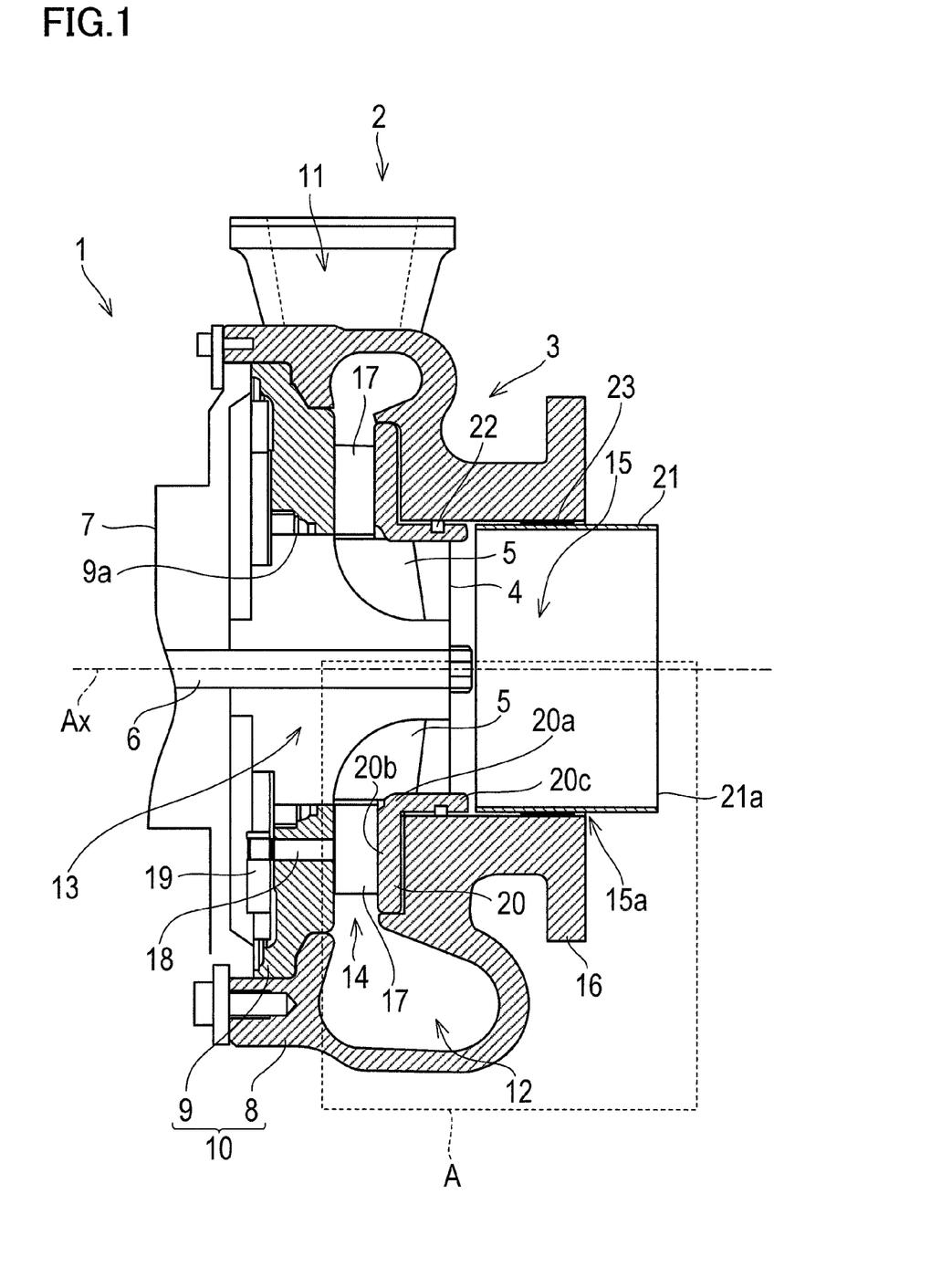
FIG. 1 is a diagram showing a turbine including a turbine housing according to one embodiment of the present invention.
Figure 2:
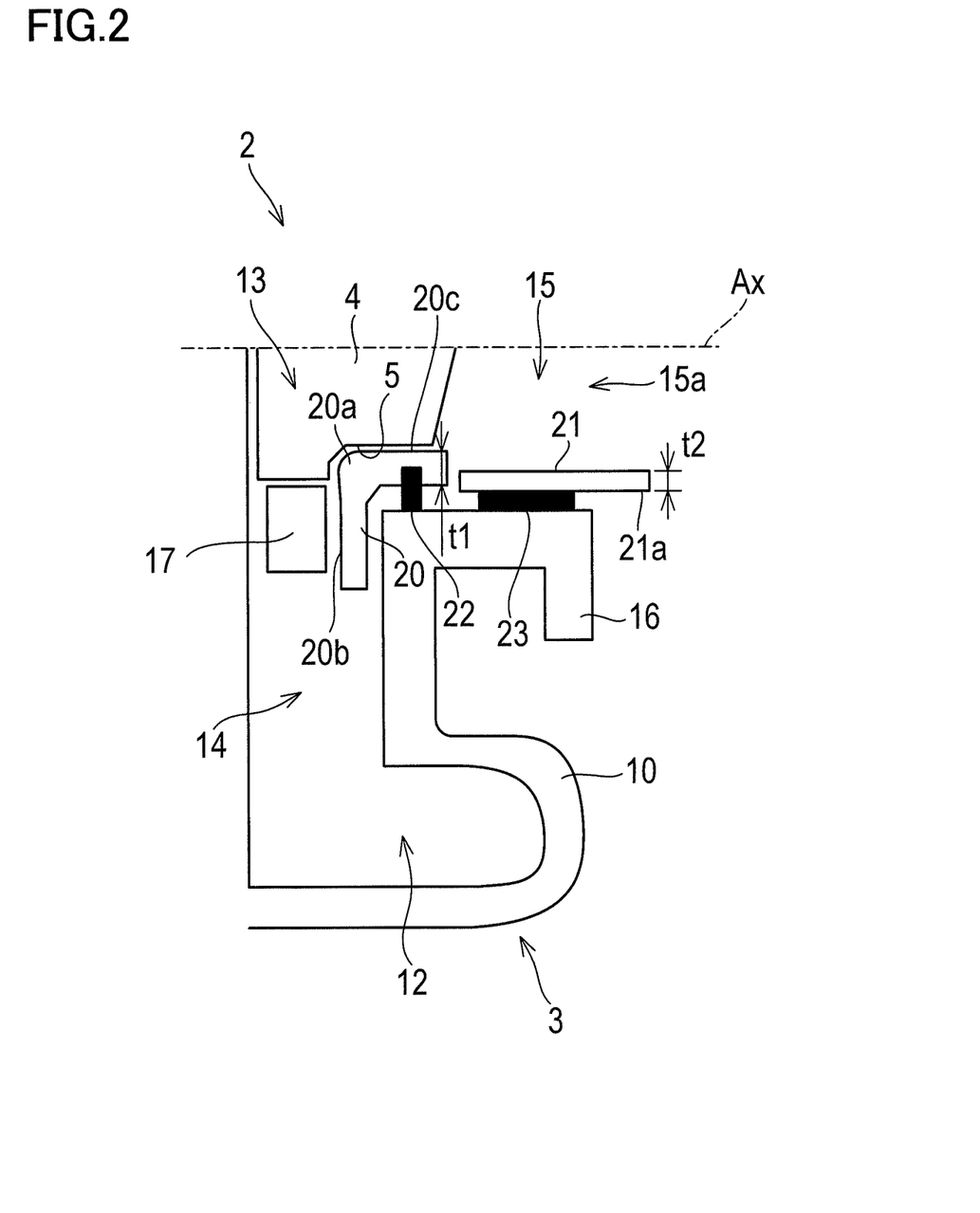
FIG. 2 is a diagram schematically showing a range A in FIG. 1.

A turbine housing according to one embodiment of the present invention will be described with reference to FIGS. 1 and 2. FIG. 1 shows a turbocharger in which the turbine housing of the present invention is incorporated. The turbocharger 1 is provided in an internal combustion engine mounted on a vehicle. The turbocharger 1 includes a turbine 2 which is provided to an exhaust passage of the internal combustion engine, and a compressor (not shown) which is provided to an air-intake passage of the internal combustion engine. The turbocharger 1 is a well known turbocharger. The turbocharger 1 drives turbine 2 by using exhaust gas of the internal combustion engine, and compresses intake air of the internal combustion engine by driving the compressor using the turbine 2.

The turbine 2 includes a turbine housing 3 and a turbine wheel 4 which is housed in the turbine housing 3. The turbine wheel 4 is provided with plural turbine blades 5 which are arranged in a circumferential direction. The turbine wheel 4 is connected to one end of a rotary shaft 6 by a weld. A compressor wheel of the compressor is attached to the other end of the rotary shaft 6. The rotary shaft 6 is supported by a center housing 7 so as to be rotatable about an axis Ax.

The turbine housing 3 includes a main body 10 which is formed by combining a housing member 8 and nozzle plate 9. As shown in this figure, the nozzle plate 9 is provided with a penetrating hole 9a which penetrates in a direction of the axis Ax. The turbine wheel 4 is inserted in the penetrating hole 9a in a freely rotatable manner. An inside of the main body 10 is provided with an introducing passage 11 for leading the exhaust gas to the inside, a spiral scroll chamber 12 communicating with the introducing passage 11, a wheel housing chamber 13 which houses the turbine wheel 4, a nozzle portion 14 which leads the exhaust gas from the scroll chamber 12 to the wheel housing chamber 13, and an exhaust passage 15 which extends in the direction of the axis from the wheel housing chamber 13. Furthermore, as shown in this figure, the main body 10 is provided with a flange 16 for connecting an exhaust pipe at a downstream of the exhaust passage 15. In the turbine housing 3, the exhaust gas is led to the scroll chamber 12 from the introducing passage 11. Subsequently, the exhaust gas is led to the wheel housing chamber 13 through the nozzle portion 14, and rotates the turbine wheel 4. Then, the exhaust gas is discharged through the exhaust passage 15.

In the nozzle portion 14, plural movable vanes 17 are arranged in the circumferential direction. Each movable vane 17 is provided with a shaft portion 18 which extends in the direction of the axis Ax. Each movable vane 17 is supported by the nozzle plate 9 so as to be rotatable to the right and left about the shaft portion 18. The turbine housing 3 is provided with a driving mechanism 19 which can change an inclination angle of each movable vane 17 at the same time. It is possible to change an opening space between the movable vanes 17 by changing the inclination angle of each movable vane 17 using the driving mechanism 19. Thereby, the turbocharger 1 is a variable geometry turbocharger.

An inside of the main body 10 is provided with an upstream-side inner pipe 20 and a cylindrical downstream-side inner pipe 21. FIG. 2 schematically shows a range A in FIG. 1. As shown in this figure, the upstream-side inner pipe 20 includes a shroud portion 20a which is arranged in the wheel housing chamber 13 and extends along an edge of the turbine blades 5. Furthermore, the upstream-side inner pipe 20 includes a ring portion 20b which forms a wall surface of the nozzle portion 14, and a cylindrical portion 20c which forms a part of a wall surface of the exhaust passage 15. In this manner, the upstream-side inner pipe 20 is located from the nozzle portion 14 until the exhaust passage 15. The upstream-side inner pipe 20 is fixed to the nozzle plate 9 by plural spacer bolts (not shown). In this case, the upstream-side inner pipe 20 is fixed so that a clearance between the shroud portion 20a and the turbine blades 5 is a few hundred micrometer. A sealing member 22 for preventing gas flow between the upstream-side inner pipe 20 and the main body 10, is provided therebetween.

The downstream-side inner pipe 21 is provided in the exhaust passage 15 so as to be located on a downstream side of the upstream-side inner pipe 20. The downstream-side inner pipe 21 is fixed to the main body 10 by a support member 23. The support member 23 is provided between the downstream-side inner pipe 21 and the main body 10 over the whole circumference. As shown in this figure, the support member 23 is located near an exhaust port 15a. A length of the downstream-side inner pipe 21 is set so that a downstream end portion 21a protrudes outside from the main body 10. As shown in this figure, a thickness t2 of the downstream-side inner pipe 21 is thinner than a thickness t1 of the upstream-side inner pipe 20. Furthermore, the downstream-side inner pipe 21 is made by a material which has corrosion resistance higher than a material of the upstream-side inner pipe 20. In particular, for example, the downstream-side inner pipe 21 may be made by a ferritic stainless steel, and the upstream-side inner pipe 20 maybe made by an austenitic stainless steel or an aluminized steel. By providing the upstream-side inner pipe 20 and the downstream-side inner pipe 21 in this manner, the turbine housing 3 provides a double tube structure at the nozzle portion 14, the wheel housing chamber 13, and the exhaust passage 15.

In the turbine housing 3 of the present invention, since the thickness t2 of the downstream-side inner pipe 21 provided on the downstream of the turbine wheel 4 is thinner than the thickness t1 of the upstream-side inner pipe 20, it is possible to decrease a heat capacity of the inner pipe 21. Furthermore, since the downstream-side inner pipe 21 is fixed to the main body 10 via the support member 23, it is possible to suppress a transfer of heat to the main body 10 from the downstream-side inner pipe 21. Thus, since it is possible to increase a temperature of the downstream-side inner pipe 21 quickly by heat of the exhaust gas and the like, it is possible to evaporate attached condensed water quickly. Thereby, it is possible to remove the condensed water quickly. Accordingly, it is possible to suppress corrosion of the downstream-side inner pipe 21.

Furthermore, since the downstream-side inner pipe 21 is made by the material which has the corrosion resistance higher than the upstream-side inner pipe 20, it is possible to suppress the corrosion of the downstream-side inner pipe 21 further.

In the turbine housing 3 of the present invention, since the thickness t1 of the upstream-side inner pipe 20 is thick, it is possible to increase stiffness of the inner pipe 20. Thereby, since it is possible to suppress deformation of the upstream-side inner pipe 20, it is possible to maintain the clearance between the shroud portion 20a and the turbine blades 5. Accordingly, it is possible to prevent decrease of a efficiency of the turbine 2.

Figure 3:
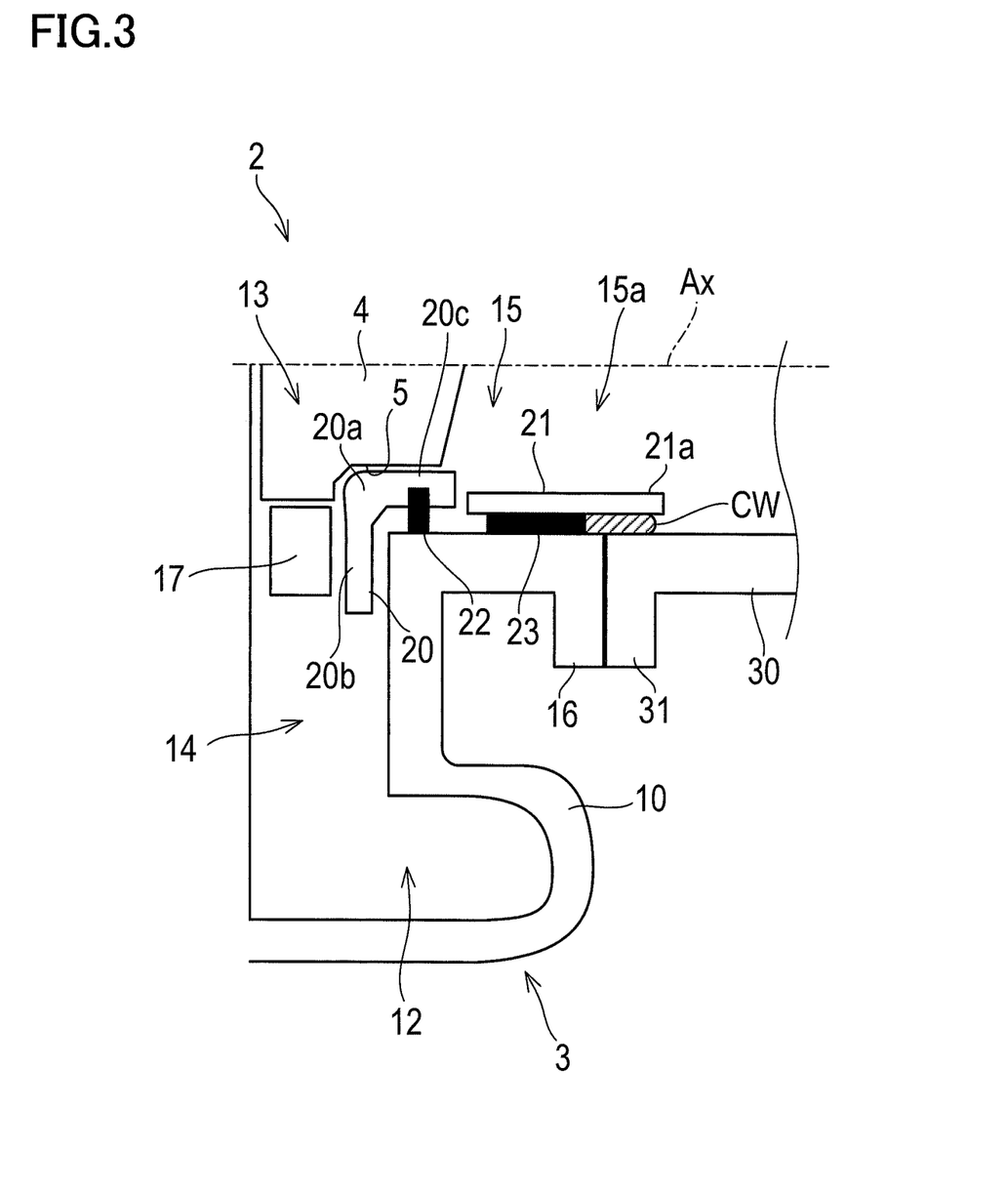
FIG. 3 is a diagram showing a connecting portion between the turbine housing and an exhaust pipe.

As shown in FIG. 3, the condensed water CW is easy to collect on a connecting portion of the flange 16 and the exhaust pipe 30. Furthermore, since the flange 16 has a high heat capacity as well known, a temperature of the exhaust gas is easy to decrease. In the present invention, since the downstream end portion 21a of the downstream-side inner pipe 21 protrudes from the main body 10, the downstream-side inner pipe 21 is also provided inside of the connecting portion. In this case, since it is possible to evaporate the condensed water CW quickly by the heat of the downstream-side inner pipe 21, it is possible to suppress collecting of the condensed water to such portions. Thereby, it is possible to suppress the corrosion.

Figure 4:
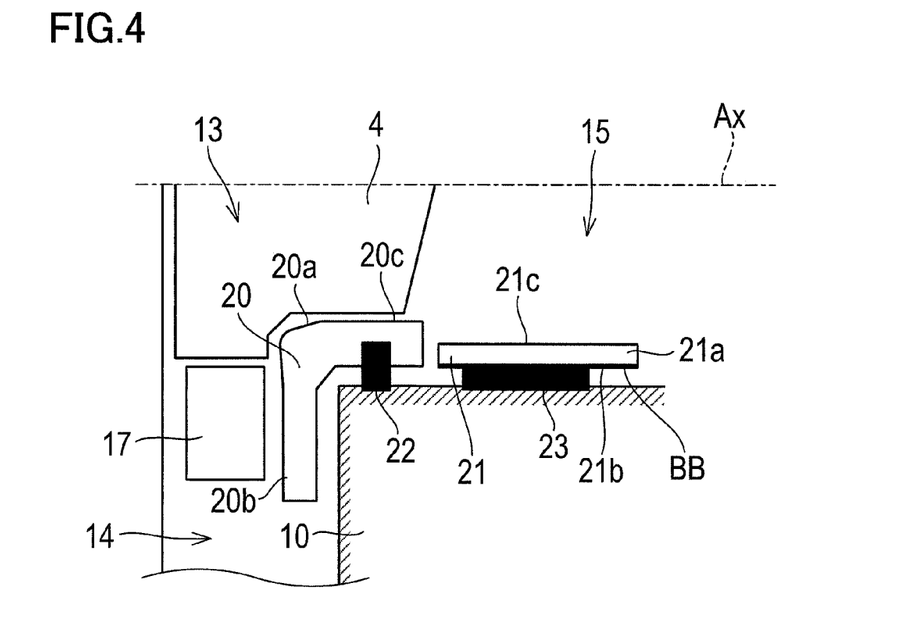
FIG. 4 is diagram for describing a variation of a downstream-side inner pipe.

In the turbine housing 3 of the present invention, on an outer surface 21b of the downstream-side inner pipe 21, a surface treatment may be performed so that a heat radiation performance becomes higher than an inner surface 21c. For example, as shown in FIG. 4, the outer surface 21b may be coated by a black body BB. In this case, it is possible to increase a temperature of the part of the exhaust passage 15 in the main body 10 by radiation heat from the downstream-side inner pipe 21. Thereby, it is possible to prevent generating the condensed water. The surface treatment is not limited to the coating of the black body, and various kinds of methods which can increase the heat radiation performance may be applied. For example, the outer surface 21b may be roughened so that the outer surface 21b is rougher than the inner surface 21c.

Next, variations of the turbine housing 3 of the present invention will be described with reference to FIGS. 5 to 8. The same components in these figures as those in FIGS. 1 to 4 are denoted by the same reference numerals, and descriptions thereof will be omitted.

Figure 5:
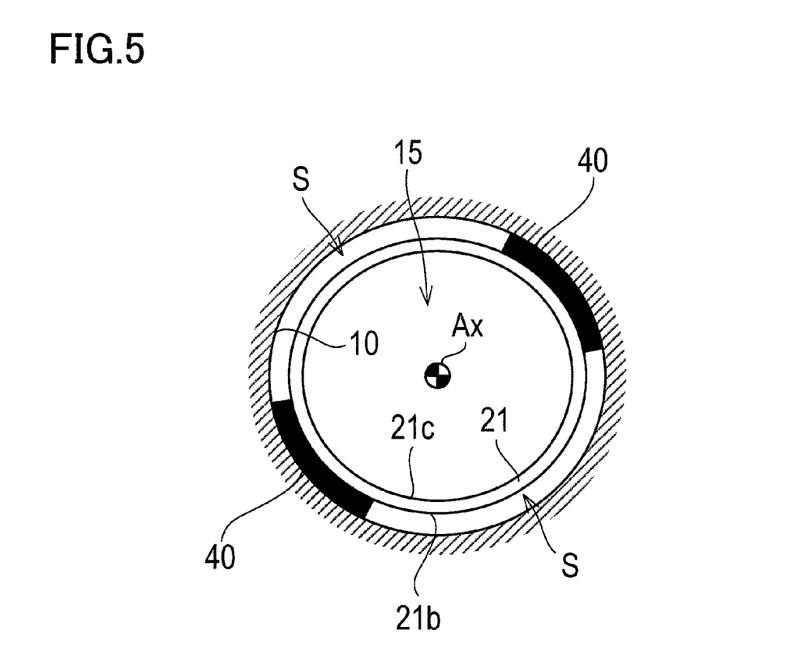
FIG. 5 is a diagram showing main portions of a turbine housing according to a first variation.

FIG. 5 shows main portions of a turbine housing 3 according to a first variation. This figure is a view showing the exhaust passage 15 viewed from the direction of the axis Ax. In this variation, the downstream-side inner pipe 21 is fixed to the main body 10 by plural support members 40 as fixing members. Each support member 40 is arranged so as to be separated from each other in the circumferential direction. Thereby, a space S which connects an upstream side and a downstream side, is formed between the support members 40. In this variation, even when the condensed water enters a clearance between the downstream-side inner pipe 21 and the main body 10, it is possible to discharge the condensed water to the downstream side. Thereby, it is possible to prevent collecting of the condensed water in the clearance. Accordingly, it is possible to suppress the corrosion of the downstream-side inner pipe 21 and the main body 10.

Figure 6:
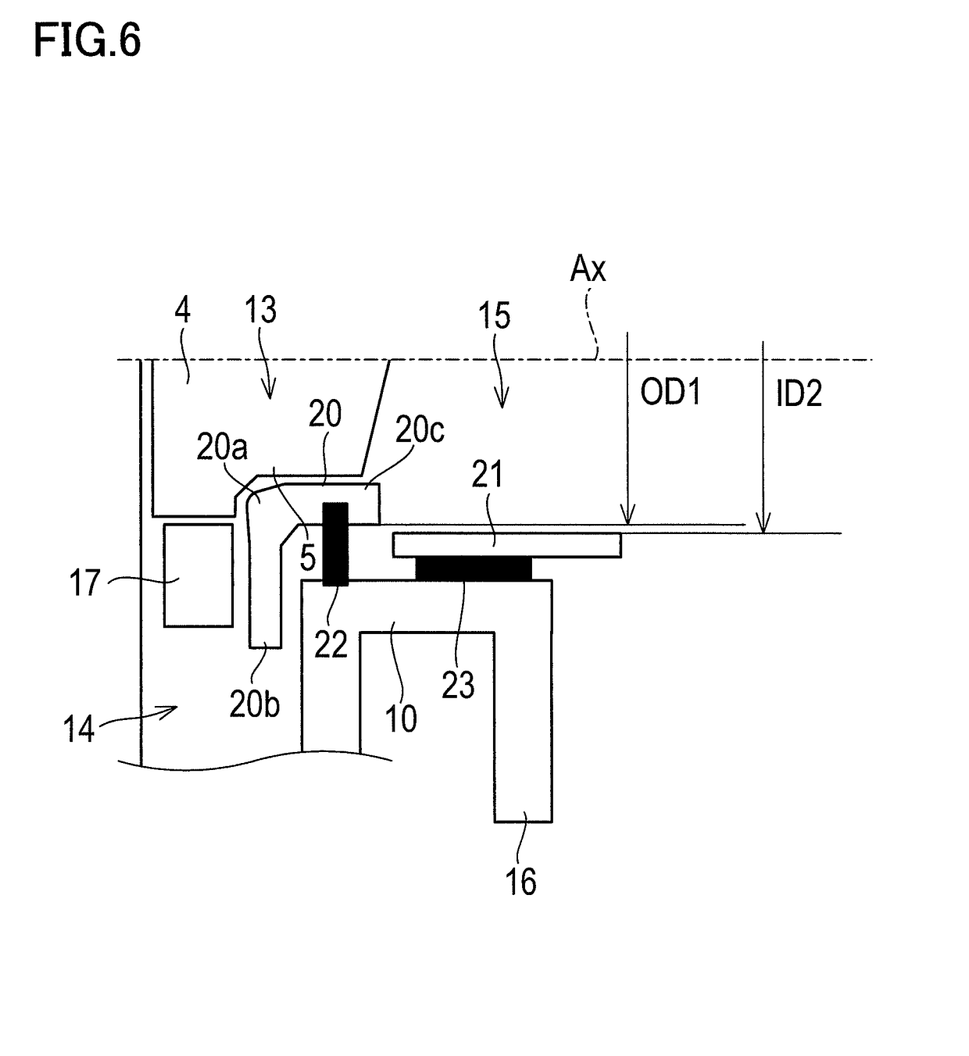
FIG. 6 is a diagram showing main portions of a turbine housing according to a second variation.
Figure 7:
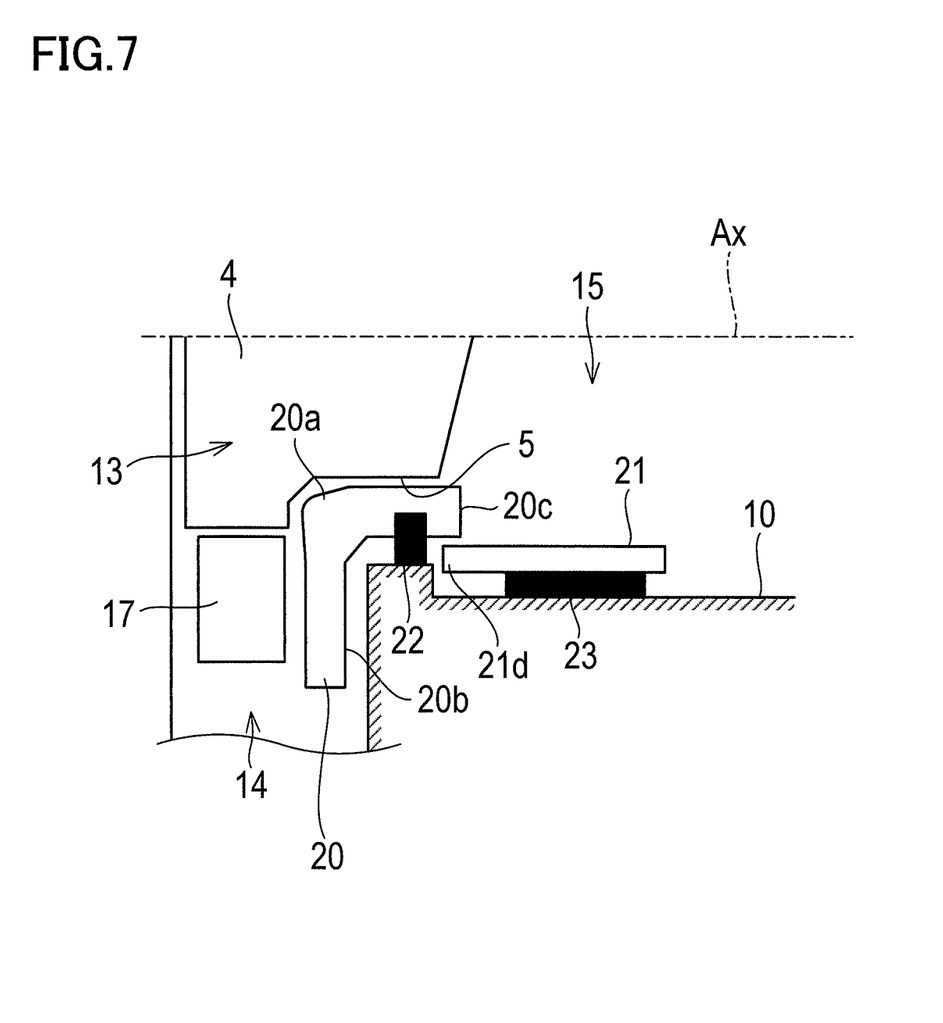
FIG. 7 is diagram showing other variation of the second variation.

FIG. 6 shows main portions of a turbine housing 3 according to a second variation. In this variation, an inside diameter ID2 of the downstream-side inner pipe 21 is larger than an outside diameter OD1 of the cylindrical portion 20c of the upstream-side inner pipe 20. In this case, even if the downstream-side inner pipe 21 moves to a side of the upstream-side inner pipe 20, no force is applied to the upstream-side inner pipe 20. Thereby, it is possible to maintain the clearance between the shroud portion 20a and the turbine blades 5. In this variation, as shown in FIG. 7, the downstream-side inner pipe 21 may be arranged so that an end portion 21d of an upstream side of the downstream-side inner pipe 21 is located on an outside of the cylindrical portion 20c.

Figure 8:
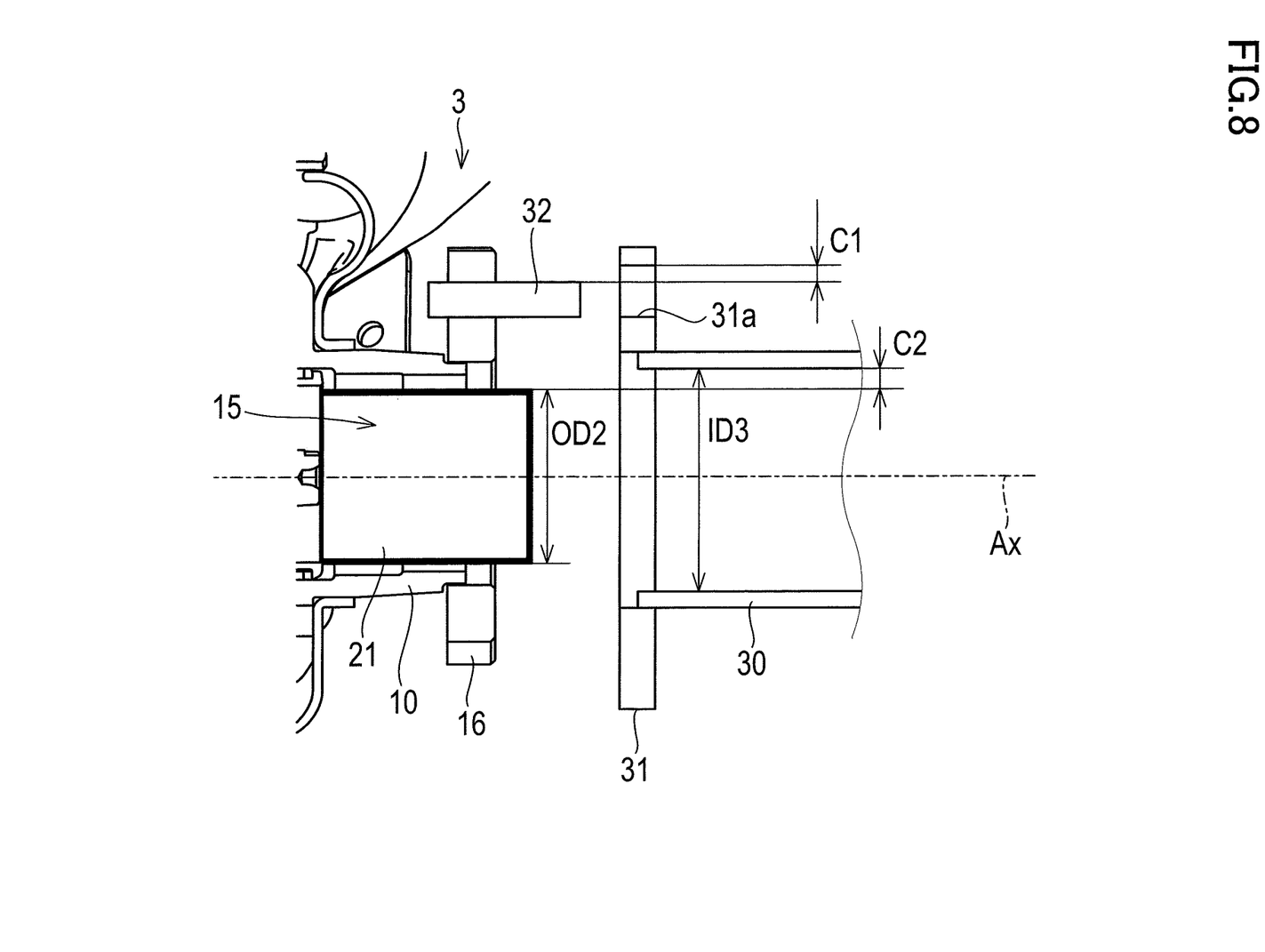
FIG. 8 is a diagram showing main portions of a turbine housing according to a third variation.

FIG. 8 shows main portions of a turbine housing 3 according to a third variation. As described above, the exhaust pipe 30 is attached to the flange 6. As shown in this figure, a flange 31 is provided on an end portion of the exhaust pipe 30. Plural stud bolts 32 for fixing the flange 31 are attached to the flange 16. Each stud bolt 32 is inserted in a bolt-hole 31a of the flange 31. As shown in this figure, when the stud bolt 32 is inserted in the bolt-hole 31a of the flange 31, a clearance C1 is formed between the stud bolt 32 and the bolt-hole 31a. In this variation, an outside diameter OD2 of the downstream-side inner pipe 21 is smaller than an inside diameter ID3 of the exhaust pipe 30. And, the outside diameter OD2 of the downstream-side inner pipe 21 is set so that a clearance C2 which is formed between the downstream-side inner pipe 21 and the exhaust pipe 30 is larger than the above mentioned clearance C1. In this case, when the exhaust pipe 30 is attached to the turbine housing 3, it is possible to prevent applying of an external force to the downstream-side inner pipe 21.

The present invention is not limited to the above-described embodiments, and various modifications of the present invention may be provided. For example, the upstream-side inner pipe and the downstream-side inner pipe may be made by a same material as each other. The present invention may be applied to a turbine housing having a double wall structure in which the main body is configured by an inner shell and an outer shell provided on the outside of the inner shell.

Figure 9:
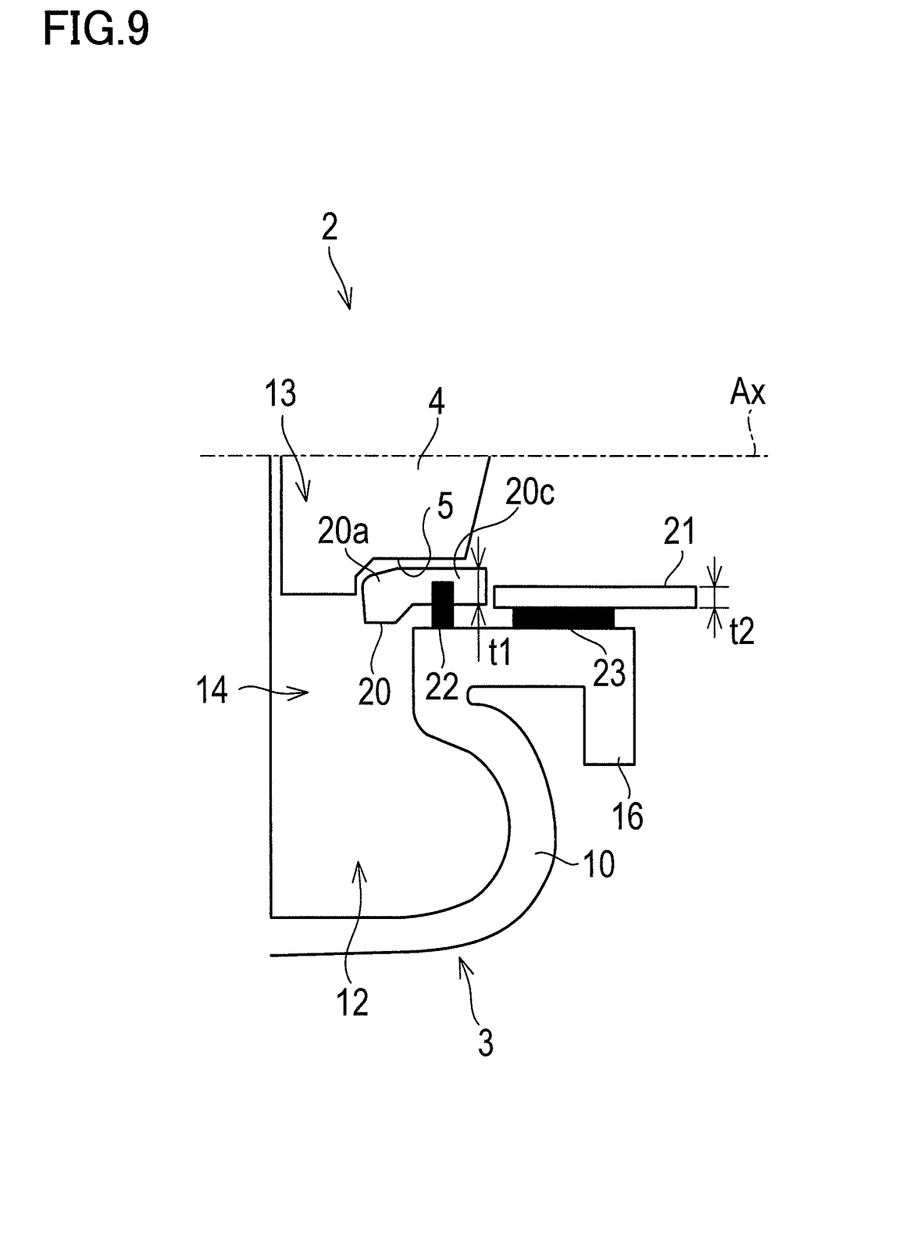
FIG. 9 is a diagram showing main portions of a turbine housing of the present invention applied to a turbine having no movable vane.

The turbine to which the turbine housing of the present invention is applied is not limited to the turbine in which the movable vanes are provided in the nozzle portion. For example, as shown in FIG. 9, the present invention may be applied to a turbine having no movable vane. In this case, the ring portion 20b of the upstream-side inner pipe 20 is omitted. In FIG. 9, the same components as those in FIG. 2 are denoted by the same reference numerals, and descriptions thereof will be omitted. In such the turbine, also by thinning the thickness t2 of the downstream-side inner pipe 21 more than the thickness t1 of the upstream-side inner pipe 20, it is possible to evaporate the condensed water quickly. Thereby, it is possible to remove the condensed water quickly.

The invention claimed is:

1. A turbine housing which is applied to a turbine incorporated in a turbocharger,
the turbine housing including a main body, in which a wheel housing chamber housing a turbine wheel and an exhaust passage are provided, the exhaust passage having one end communicating with an outlet of the wheel housing chamber and the other end providing an exhaust port, and gas passing through the wheel housing chamber being discharged from the exhaust port to outside through the exhaust passage, wherein
the main body is provided with an upstream-side inner pipe and a downstream-side inner pipe therein, the upstream-side inner pipe having a shroud portion which is located in the wheel housing chamber and extends along edges of turbine blades of the turbine wheel, the downstream-side inner pipe being arranged in the exhaust passage so as to be located on a downstream side with respect to a direction of gas flow to the upstream-side inner pipe,
the downstream-side inner pipe being separated from the main body so that a clearance is provided between the downstream-side inner pipe and the main body, and also separated from the upstream-side inner pipe, and
a thickness of the downstream-side inner pipe is thinner than a thickness of the upstream-side inner pipe.

2. The turbine housing according to claim 1, wherein
a flange for connecting an exhaust pipe to downstream of the exhaust passage is provided around the exhaust port of the main body, and
a length of the downstream-side inner pipe is set so that an end portion located on the downstream side of the gas flow of the downstream-side inner pipe protrudes from the main body.

3. The turbine housing according to claim 1, wherein
the downstream-side inner pipe is fixed to the main body by plural fixing members which are provided between the downstream-side inner pipe and the main body, and
the plural fixing members are arranged on an outer circumferential of the downstream-side inner pipe so as to be separated from each other in a circumferential direction.

4. The turbine housing according to claim 1, wherein
the downstream-side inner pipe is made by a material which has a corrosion resistance higher than the upstream-side inner pipe.

5. The turbine housing according to claim 1, wherein
on an outer surface of the downstream-side inner pipe, a surface treatment is performed so that a heat radiation performance of the outer surface is higher than that of an inner surface of the downstream-side inner pipe.

6. The turbine housing according to claim 1, wherein
an end portion located on the downstream side of the gas flow of the upstream-side inner pipe and an end portion located on the upstream side of the gas flow of the downstream-side inner pipe are formed cylindrically, and
an inside diameter of the end portion located on the upstream side of the gas flow of the downstream-side inner pipe is larger than an outside diameter of the end portion located on the downstream side of the gas flow of the upstream-side inner pipe.

\* \* \* \* \*